United States Patent Office 3,031,414
Patented Apr. 24, 1962

3,031,414
ELECTROLUMINESCENT PHOSPHORS
George H. Morrison, Westbury, and Frank C. Palilla, Maspeth, N.Y., assignors to General Telephone and Electronics Laboratories, Inc., a corporation of Delaware
No Drawing. Filed Aug. 22, 1960, Ser. No. 50,867
5 Claims. (Cl. 252—301.6)

Our invention relates to electroluminescent devices and materials.

In many lighting applications, it is necessary to produce white colored electroluminescent emission. One known technique for producing white emission is to mix blue emitting zinc sulfide electroluminescent phosphors and yellow emitting zinc sulfu-selenide electroluminescent phosphors together in suitable proportions. This mixture, when electrically excited, yields blue and yellow emission having such relative intensities that a composite white light results.

This known technique, however, suffers from certain serious limitations. In particular, many critical interactions among the phosphor synthesis parameters are not quantitatively reproducible. As a result, different batches of the same material, when electrically excited, will not emit light of the same shade; i.e. the ranges of spectral emission of different batches will differ one from the other. Further, both the efficiency and the brightness of the above described phosphor mixture are low.

Accordingly, it is an object of our invention to provide a white emitting electroluminescent phosphor mixture having a reproducible range of spectral emission.

Still another object of our invention is to increase the brightness of a white emitting electroluminescent phosphor mixture.

Yet another object is to provide a new electroluminescent lamp adapted when energized to emit white light.

These and other objects of our invention will either be explained or will become apparent hereinafter.

In accordance with the principles of our invention, a blue emitting electroluminescent phosphor activated with copper is mixed together with a green emitting electroluminescent phosphor activated with copper and a yellow emitting electroluminescent phosphor activated with copper and manganese to produce a phosphor mixture, the ratio by weight of the blue emitting phosphor to that of the green emitting phosphor to that of the yellow emitting phosphor being given as $x:y:z$, where $x$ falls within the range (3–5), $y$ falls within the range (0.5–1.5), and $z$ falls within the range (7–10).

This phosphor mixture was dispersed in dielectric and interposed between the electrodes of an electroluminescent lamp. When an alternating voltage was supplied to the lamp, we found that a bright white light was produced at relatively high efficiencies. Further we found that, although the shade of the white light could be varied by varying the relative proportions of the phosphor components, any particular shade could be reproduced from different batches of phosphors and phosphor mixtures, merely by holding the relative proportions of the components constant at some predetermined value. Moreover, the shade of the white light emitted does not change appreciably as the frequency of the applied voltage is varied over a wide range.

Illustrative embodiments of our invention will now be described with reference to the examples which follow.

*Example I*

200 grams of a copper activated, chloride coactivated zinc sulfide cathodoluminescent phosphor (i.e. a commercially available cadmium free cathodoluminescent zinc sulfide phosphor activated with 0.01%–.03% copper) were vigorously ground in an electric motor driven mortar and pestle for a period of 20 minutes. 20 grams of the ground phosphor were mixed with 0.5 gram of copper sulfate and 7.0 grams of zinc sulfate. This mixture was fired at a temperature of 800 °C. and then washed with cyanide ion to remove all excess copper in a manner set forth in more detail in our co-pending patent application Serial No. 852,959, filed November 16, 1959, to produce a blue emitting electroluminescent phosphor.

20 grams of cathodoluminescent phosphor identical with the cathodoluminescent phosphor described above (except that it had been activated with 0.08% copper) were ground, mixed with 0.5 gram of copper sulfate and 7.0 grams of zinc sulfate, fired and washed as above to produce a green emitting electroluminescent phosphor.

20 grams of a cathodoluminescent phosphor identical with the cathodoluminescent phosphor described above were ground, mixed with 0.5 gram of copper sulfate, 1.68 grams of manganese carbonate and 7.0 grams of zinc sulfate, fired and washed as above to produce a yellow emitting electroluminescent phosphor.

The blue, green and yellow emitting electroluminescent phosphors were then mixed together in a weight ratio 3:0.5:7 respectively.

This phosphor mixture was incorporated into a 5 mil gap demountable electroluminescence test cell using a castor oil as a dielectric with a loading of two parts by weight of the mixture to one part by weight of the castor oil.

When an alternating voltage of 600 volts R.M.S. at a frequency of 60 cycles per second was applied to the cell, white light was emitted. The brightness of the emitted light was about 8.0 foot lamberts, and the efficiency of the cell was in excess of 4 lumens per watt. The frequency was varied from 60 to 6000 c.p.s. and the color of the emitted light did not change. The brightness of the emitted light, however, increased to 150 foot lamberts.

*Example II*

The blue, yellow and green emititng phosphors of Example I were mixed together in weight ratios of 5:7:0.5. The results were essentially the same as in Example I except that the color of the emitted light was shifted from white to a blue-white.

*Example III*

The procedure of Example II was repeated using weight ratios of 3:10:0.5. The color of the emitted light was yellow-white.

*Example IV*

The procedure of Example II was repeated using weight ratios of 3:7:1.5. The color of the emitted light was green-white.

What is claimed is:

1. An electroluminescent phosphor mixture which, when subjected to the influence of an electric field, will produce white light, said mixture consisting of (a) a blue emitting electroluminescent phosphor component consisting of a first cathodoluminescent copper activated chloride coactivated zinc sulfide phosphor containing 0.01–0.03% copper fired with 1% copper as copper sulfate and 35% zinc sulfate, said percentages being expressed by weight of said first cathodoluminescent phosphor, (b) a green emitting electroluminescent phosphor component consisting of a second cathodoluminescent copper activated chloride coactivated zinc sulfide phosphor containing 0.08% copper fired with 1% copper as copper sulfate and 35% zinc sulfate, said percentages being expressed by weight of said second cathodoluminescent phosphor, and (c) a yellow emitting electroluminescent phosphor component consisting of a third cathodoluminescent copper activated chloride coactivated zinc sulfide phosphor containing 0.01–0.03% copper fired with 1% copper as copper sulfate, 4% manganese as manganese carbonate and 35% zinc sulfate, said percentages being expressed by weight of said third cathodoluminescent phosphor, the ratio by weight of said blue emitting component to said green emitting component to said yellow emitting component being $x:y:z$, where $x$ falls within the range 3–5, $y$ falls within the range 0.5–1.5, and $z$ falls within the range 7–10.

2. An electroluminescent phosphor mixture as defined in claim 1, wherein the ratio by weight of said blue emitting component to said green emitting component to said yellow emitting component is $x:y:z$, where $x$ equals 3, $y$ equals 0.5 and $z$ equals 7.

3. An electroluminescent phosphor mixture as defined in claim 1, wherein the ratio by weight of said blue emitting component to said green emitting component to said yellow emitting component is $x:y:z$, where $x$ equals 5, $y$ equals 0.5 and $z$ equals 7.

4. An electroluminescent phosphor mixture as defined in claim 1, wherein the ratio by weight of said blue emitting component to said green emitting component to said yellow emitting component is $x:y:z$, where $x$ equals 3, $y$ equals 0.5 and $z$ equals 10.

5. An electroluminescent phosphor mixture as defined in claim 1, wherein the ratio by weight of said blue emitting component to said green emitting component to said yellow emitting compenent is $x:y:z$, where x equals 3, $y$ equals 1.5 and $z$ equals 7.

References Cited in the file of this patent

Bowtell: Electroluminescence and its Application, I.E.E., August 1957, pages 454–459.

Color T.V. Principles and Practices, General Electric Pub. 1957, part I, Colorimetry, pages 1–20.